United States Patent [19]

Peacock, deceased et al.

[11] Patent Number: 4,625,474
[45] Date of Patent: Dec. 2, 1986

[54] TUBE-TYPE TERMITE CONTROL SYSTEM

[76] Inventors: Richard C. Peacock, deceased, late of Honolulu; Ruby L. Peacock, personal representative, 2726 Waiwai Loop, Honolulu, both of Hi. 96819

[21] Appl. No.: 595,965

[22] Filed: Apr. 2, 1984

[51] Int. Cl.$^4$ .............................................. A01M 1/20
[52] U.S. Cl. ...................................... 52/101; 43/124; 137/357
[58] Field of Search ............... 52/169.1, 169.5, 101, 52/517; 43/124; 137/357, 358

[56] References Cited

U.S. PATENT DOCUMENTS

| | | | |
|---|---|---|---|
| 2,138,182 | 11/1938 | Lipthrott | 52/101 |
| 2,344,782 | 3/1944 | Muller | 52/101 |
| 2,842,892 | 7/1958 | Aldridge | 52/101 |
| 2,915,848 | 12/1959 | Griffin | 52/101 |
| 2,981,025 | 4/1961 | Woodson | 52/101 |
| 3,209,485 | 10/1965 | Griffin | 43/124 |
| 3,330,062 | 7/1967 | Carter | 52/101 |
| 3,513,586 | 5/1970 | Meyer | 43/124 |
| 3,602,248 | 8/1971 | Peacock | 43/124 |

FOREIGN PATENT DOCUMENTS 2221074 10/1974 France ............................... 43/124

Primary Examiner—John E. Murtagh
Attorney, Agent, or Firm—Harvey B. Jacobson

[57] ABSTRACT

A termite control system utilizing an underground tube associated with underground or ground contacting foundation components of a building with the tube having discharge openings by which an insecticide may be discharged into ground areas adjacent the foundation of a building or the like for control of subterranean termites. In one embodiment, the tube system is associated with a posted or pier construction supporting a wood or composite floor. In a second other embodiment, the tube system encircles a pole-type foundation or support. In a third embodiment of the invention, the tube system is associated with a retaining bearing wall which has backfill dirt associated therewith. In each embodiment, the tubes are provided with radial slits to discharge insecticide therefrom with at least one end of the tube or tubes extending to a position accessible from a point above ground level to enable insecticide to be pumped into the tubes under predetermined pressure.

2 Claims, 6 Drawing Figures

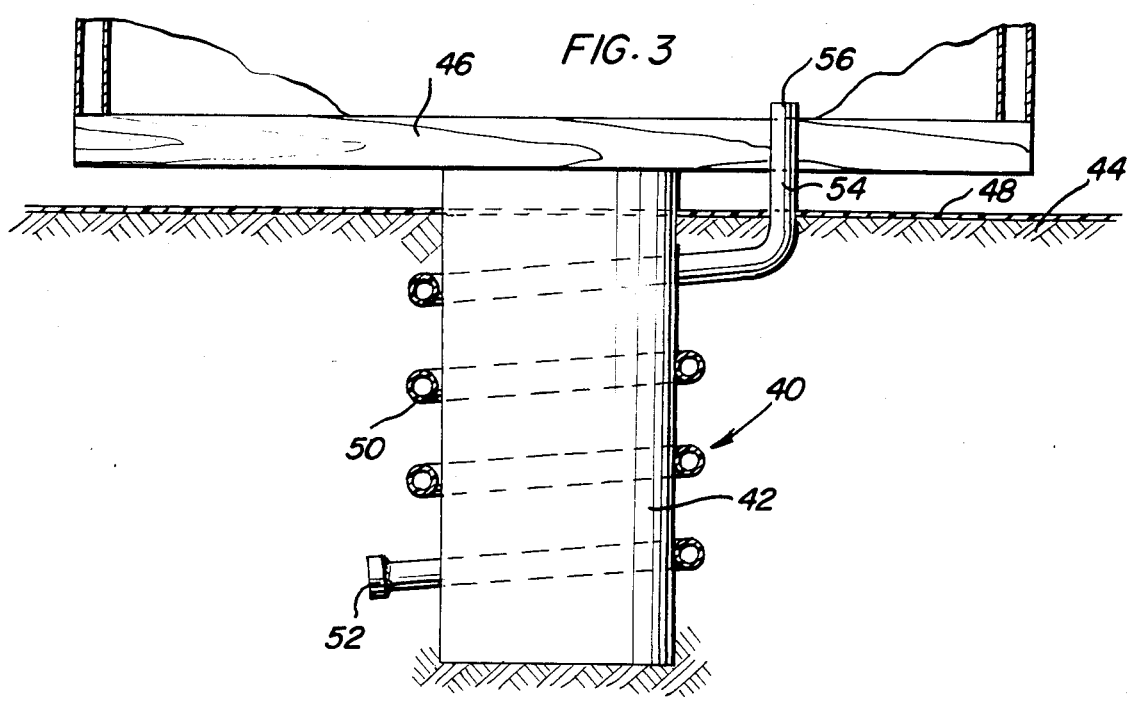
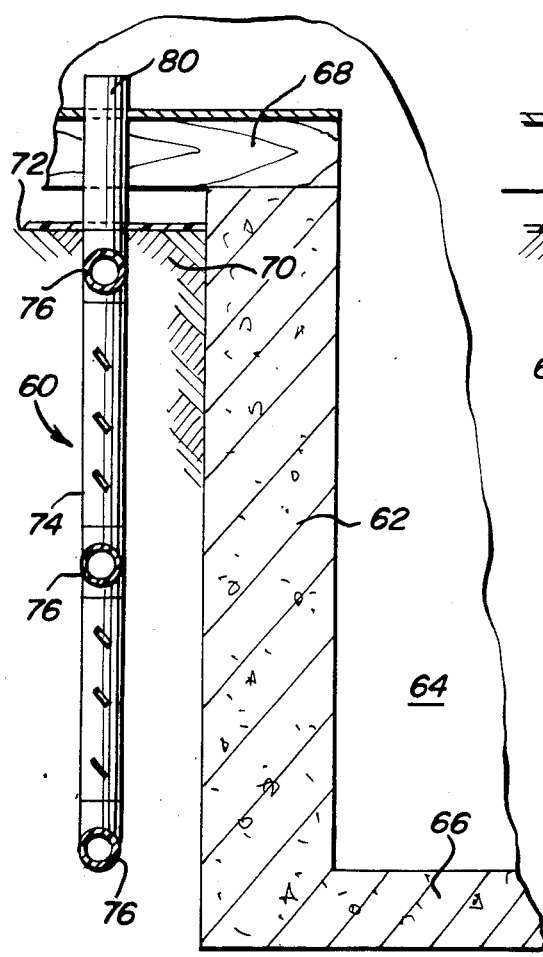
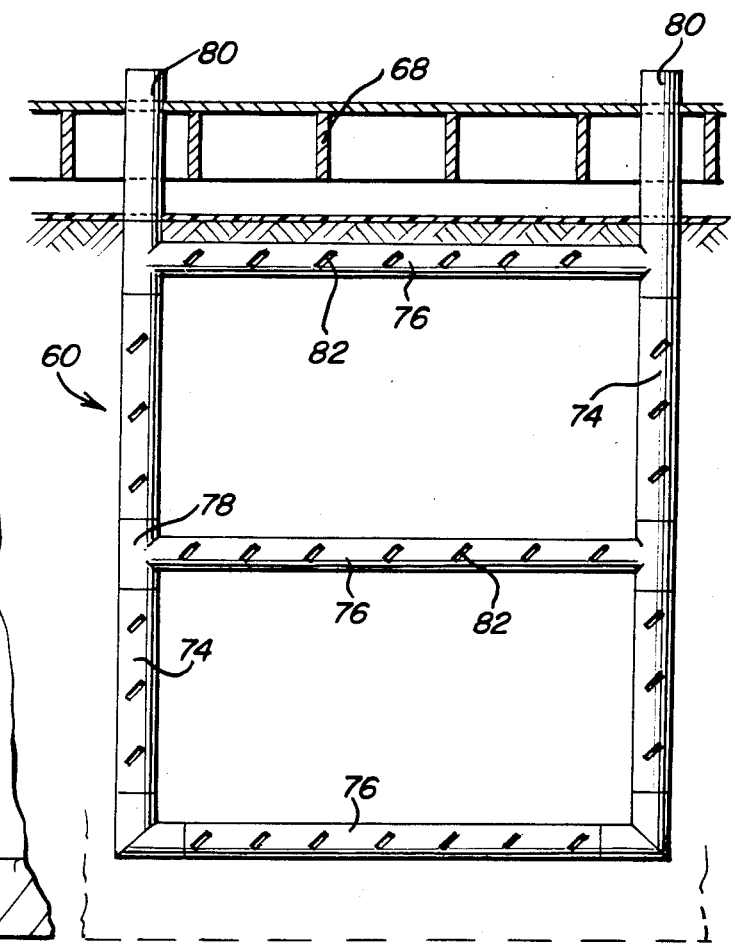

TUBE-TYPE TERMITE CONTROL SYSTEM

BACKGROUND OF THE INVENTION

1. Field of the Invention

The present invention generally relates to a termite control system in the form of a tube or tubes associated with various types of ground contacting supporting arrangements for buildings by which insecticide can be periodically discharged into the ground area along the surfaces of the support structure for protecting the support structure from attack by subterranean termites with the concepts of the invention being disclosed in three embodiments each of which employ the same principles of operations.

2. Description of the Prior Art

Prior U.S. Pat. No. 3,602,248, issued Aug. 31, 1971, discloses a termite control system in which an underground tube system is associated with a concrete slab-type foundation. Prior U.S. Pat. No. 4,297,055, issued Oct. 17, 1981, discloses a technique by which an underground tube can be inserted under an existing concrete foundation. The prior patents cited and made of record in the above-mentioned patents and the following U.S. patents relate to this field of endeavor:

U.S. Pat. No. 2,842,892; July 15, 1958
U.S. Pat. No. 2,915,848; Dec. 8, 1959
U.S. Pat. No. 3,330,062; July 11, 1967
U.S. Pat. No. 3,513,586; May 26, 1970
U.S. Pat. No. 3,909,975; Oct. 7, 1975
U.S. Pat. No. 4,043,073; Aug. 23, 1977

While the above discussed and listed patents relate to this field of endeavor, they do not disclose the tube system utilized in this invention.

SUMMARY OF THE INVENTION

An object of the present invention is to provide a tube-type termite control system that will effectively protect building structures other than slab-on-grade construction to provide chemical treataent to such other types of construction to prevent subterranean termite infestation.

Another object of the invention is to provide a termite control system enabling insecticide to be discharged to inaccessible areas by installing a tube system at the time of construction with at least one end of the tube system extending above ground to an accessible location so that liquid insecticide can be pumped into the tube system under predetermined pressure for treatment of the ground area associated with discharge slits in the tube susem.

A further object of the invention is to provide a tube-type termite control system that can be effectively used for posted or pier construction, pole-type construction and retaining backfill bearing wall construction.

Still another object of the invention is to provide a termite control system which can be easily installed at the time of construction of the building and is relatively inexpensive and enables efficient control of subterranean termites in order to prevent infestation of wood components of a building.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a schematic side elevational view illustrating the termite control system of the present invention associated with a pole-type of construction.

FIG. 5 is a schematic sectional view of a retaining bearing wall construction in which the tube system is associated with the bearing wall and the backfill dirt positioned against the wall.

FIG. 6 is an elevational view of the construction of FIG. 5 illustrating further details of the tube system.

DESCRIPTION OF THE PREFERRED EMODIMENTS

Figure 1:
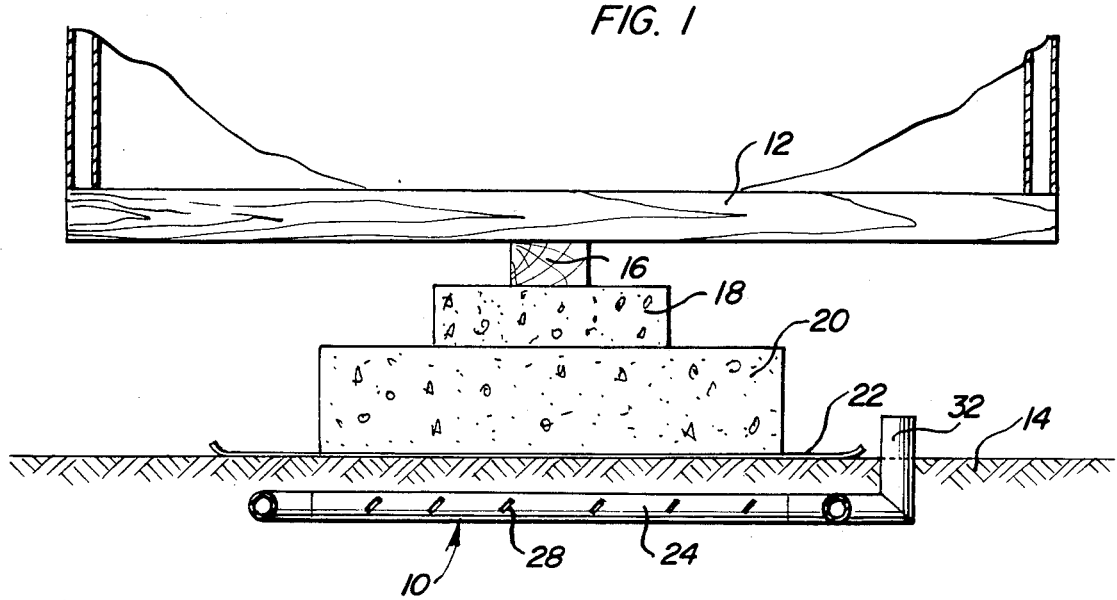
FIG. 1 is a schematic side elevational view of a posted or pier construction with the tube-type termite control system of the present invention associated therewith.
Figure 2:
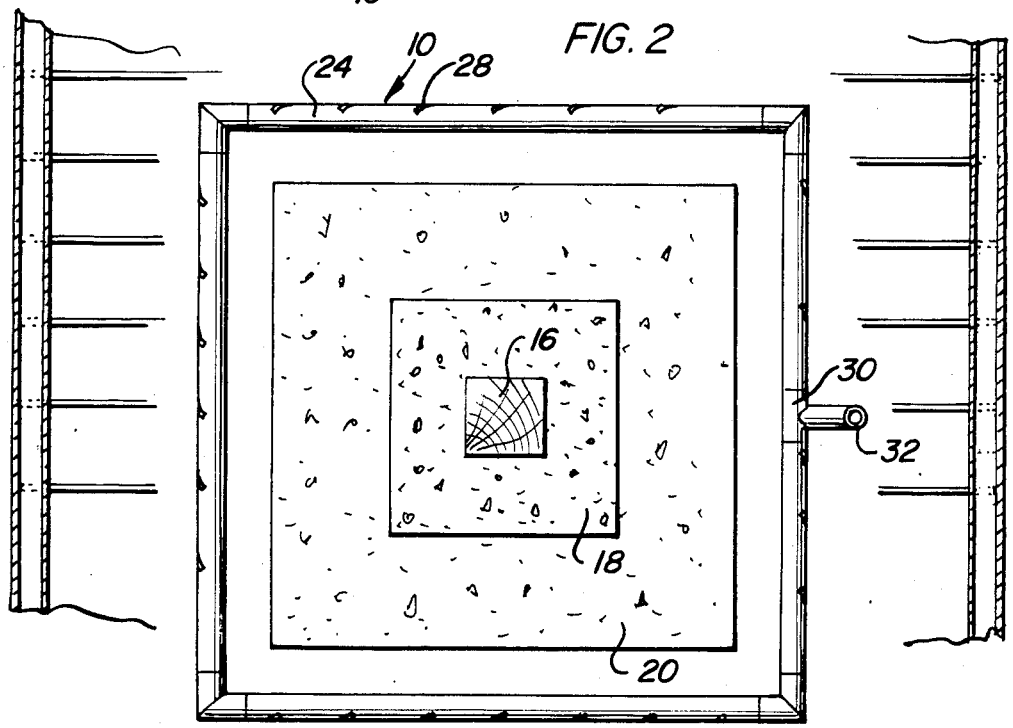
FIG. 2 is a plan view of the construction of FIG. 1 illustrating the association of the tube system with the building construction.

Referring now specifically to FIGS. 1 and 2 of the drawings, the tube-type termite control system of the present invention is generally designated by reference numeral 10 and is associated with a "posted" or pier construction which supports a wood or composite flooring 12 in spaced relation above the ground surface 14. The floor 12 is supported by a wood post or pier 16 which in turn is supported by concrete blocks 18 and 20 which may be a plurality of blocks joined together by mortar or precast blocks which supportingly engage the ground surface with there usually being provided a barrier element 22 of waterproof material. The concrete blocks 20 constitute a foundation or pier footing with the tube system 10 of the present invention being placed under and peripherally of the footing formed by the concrete blocks 18 and 20 as illustrated in FIG. 2. The tube system includes a tube 24 of one-piece construction or a plurality of tubes joined by connectors 26 in a conventional manner. The tube 24 includes a plurality of radial slits 28 in the periphery thereof for discharging liquid insecticide under and around the footing for substantially complete chemical saturation of the area around and under the pier flooring formed by the concrete blocks 20. One of the tubes 24 includes a T-fitting 30 and upstanding standpipe 32 which extends to a point above ground and may be provided with a suitable closure cap which can be removed to enable insertion of the chemical insecticide into the tube system 10 under predetermined pressure with such pressure tending to open up the slits 28 for discharge of chemical insecticide. The tubes 24 as well as the connectors 26 and 30 and pipe 32 are all constructed of plastic material and may be conventional polyethylene tubing having slits 28 formed therein. Experience has shown that subterranean termites will utilize the footing formed by the concrete blocks 18 and 20 to gain access to the wood post 16 and wood flooring 12. Frequently, the wood flooring is only a few inches above ground level making it quite difficult to treat the area under the pier footing by conventional techniques. With the permanently installed tube system 10 of the present invention, periodic treatment may be accomplished by merely inserting a hose or other pump discharge adaptor into the pipe 32 in sealed relation and pumping liquid insecticide into the tube system 10 under a predetermined pressure for effective treatment against subterranean termite infestation.

Figure 4:
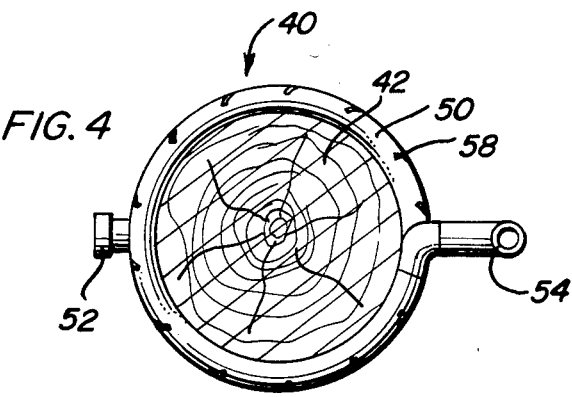
FIG. 4 is a plan view of the construction of FIG. 3 illustrating the association of the tube system with the supporting pole.

Referring now specifically to FIGS. 3 and 4 of the drawings, the tube-type termite control system illustrated in this embodiment of the invention is generally designated by numeral 40 and is associated with a "pole house" type of construction in which a large telephone pole 42 or similar large wood pillars or pilings are sunk several feet into the soil below ground level 44 with the pole or post 42 forming the support for a wood floor 46 which is spaced above ground level a short distance with a vapor barrier 48 normally being provided on the top surface of the ground soil. In this embodiment of the invention, a continuous tube 50 is provided in closely encircling relation to the pole 42 with the tube 50 spiralling around the pole 42 from a point adjacent the upper end to a point adjacent the lower end. The lower end of the tube 50 may be provided with a closure cap 52 and the upper end thereof is provided with an upstanding standpipe 54 which extends above ground level and may extend through and above the floor 46 and terminating in an open end 56 which may be closed by a cap or the like to provide access to the tube 50. Also, the tube 50 is provided with a plurality of longitudinally spaced radial slits 58 throughout the length thereof so that when the liquid insecticide is placed in the tube 50 under pressure, the insecticide will be discharged peripherally around the post 42 thus protecting the post 42 from subterranean termite infestation. In this situation, conventional termite treatment is not effective because of the depth of the poles 42 into the ground inasmuch as conventional soil treatment only extends about 12 inches into the soil and wood below that level will be susceptible to termite infestation. With the present tube installation, the tubing 50 that is spiralled around the post or pillar prior to backfilling will provide total coverage and protection for the pole or pillar that becomes inaccessible to conventional treatment after completion of the house. In this type of construction, the pole or pillar may support a wood or composite floor only a few inches off the ground and therefore, the pole is not accessible to conventional treatment through the crawl space. The installation of the tube system 40 of this embodiment will enable effective treatment of the soil throughout the length of the pole, post or pillar 42 and prevent subterranean termite infestation of the wood support 42.

FIGS. 5 and 6 illustrate another embodiment of the invention generally designated by the numeral 60 which is associated with a construction having a retaining bearing wall 62 oriented vertically to define a basement space 64 with a concrete floor 66 usually being provided therefor. This type of construction is found in split level or full basement construction with the wall 62 supporting a wood or composite floor 68 in a convention manner. Also, backfill earth 70 is engaged with the outer surface of the retaining wall 62 with the upper ground level 72 being relatively close to the floor 68 but spaced therefrom to define a crawl space. As can be appreciated, this area cannot be reached by conventional treatment methods as the chemical only penetrates about 12 inches into the soil. In this construction, vertical tubes 74 and horizontal tubes 76 are installed generally in parallel but closely spaced relation to the retaining wall 62 with the tubes being interconnected by connectors 78. The upper ends of the vertical tubes 74 extend through the floor 68 to open upper ends 80 which may be provided with a closure cap if desired so that liquid insecticide can be pumped into either or both of the vertical tubes 74. Also, the vertical and horizontal tubes 74 and 76 are provided with radial slits 82 through which insecticide may be discharged. As indicated, the tube system 60 is laid to the base of the footing or wall 62 in a network which affords total coverage of the bearing wall and total coverage of the backfilled areas which are prime entry points for subterranean termites.

By constructing the system from plastic tubing of conventional construction which resists corrosion from the insecticide, the cost of installation can be maintained at a minimum. Utilization of radial spiral slits enable these slits to open under pressure thereby avoiding clogging. Also, this system extends below ground to whatever extent the support structure for the building extends and the slits may be arranged circumferentially so that chemical are dispersed in all directions and by using inexperience materials, the system is not cost prohibitive and also efficiently enables periodic treatment of all of the areas of a supporting structure which are in contact with the soil and which could provide a path of access for subterranean termites.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A termite control system for a pier-type support structure disposed inwardly of the perimeter of a building and supporting the building above ground surface to form a crawl space to protect wood floor and other wood components of the building from termite infestation, said system comprising a tube associated with the support structure for the building and extending along the surface of the support structure horizontally and vertically throughout the surface area of the support structure in contact with the ground for protecting the support structure and forming a barrier to passage of termites throughout the vertical height and horizontal dimensions of the support structure for the building, said tube including a plurality of slits therein for discharging liquid chemicals into the ground, at least one end of the tube extending above ground for access thereto to enable termite killing insecticides to be discharged into the tube for passage therethrough and discharge into the ground, said tube being in the form of a closed loop about the perimeter of and below the pier-type support structure, the upper end of the tube extending above ground surface and terminating in the crawl space outwardly of the pier-type support structure and inwardly of the building perimeter to provide access thereto.

2. A termite control system for building support structure to protect wood floor and other wood components of a building from termite infestation, said system comprising a tube associated with the support structure for the building and extending along the surface of the support structure horizontally and vertically throughout the surface area of the support structure in contact with the ground for protecting the support structure and forming a barrier to passage of termites throughout the vertical height and horizontal dimensions of the support structure for the building, said tube including a plurality of slits therein for discharging liquid chemicals into the ground, at least one end of the tube extending above ground for access thereto to enable termite killing insecticides to be discharged into the tube for passage therethrough and discharge into the ground, said tube defining a spiral enclosure for a wood pole support structure for the building, the upper end of the tube extending above ground surface and through and above the floor to enable access thereto from interiorly of the building without gaining access through a crawl space between the upper surface of the ground and the floor of the building structure.

* * * * *